United States Patent [19]

McGalliard

[11] Patent Number: 4,769,229
[45] Date of Patent: Sep. 6, 1988

[54] SULFUR RECOVERY PROCESS USING METAL OXIDE ABSORBER FEED FOR REGENERATION

[75] Inventor: Russell L. McGalliard, Broken Arrow, Okla.

[73] Assignee: Amoco Corporation, Chicago, Ill.

[21] Appl. No.: 912,023

[22] Filed: Sep. 25, 1986

[51] Int. Cl.$^4$ .................. C01B 17/04; B01D 53/34
[52] U.S. Cl. .................. 423/574 R; 423/230
[58] Field of Search .................. 423/230, 574 R

[56] References Cited

U.S. PATENT DOCUMENTS

| | | | |
|---|---|---|---|
| 2,416,044 | 2/1947 | Calbeck | 423/622 |
| 4,044,114 | 8/1977 | Dezael et al. | 423/574 R |
| 4,363,790 | 12/1982 | Anderson et al. | 423/230 |
| 4,533,529 | 8/1985 | Lee | 423/230 |

FOREIGN PATENT DOCUMENTS 159730 10/1985 European Pat. Off. ........ 423/574 R

*Primary Examiner*—John Doll
*Assistant Examiner*—Jeffrey Edwin Russel
*Attorney, Agent, or Firm*—L. Wayne White

[57] ABSTRACT

Regeneration of sulfided metal oxide absorbent in an absorber is conducted using as diluent for oxygen a portion of Claus plant gas-in-process withdrawn upstream of the absorber. The result is a reduction in the size of the absorber and/or a reduction in the rate of return of regeneration effluent to a Claus plant during regeneration of such absorbent.

8 Claims, 1 Drawing Sheet

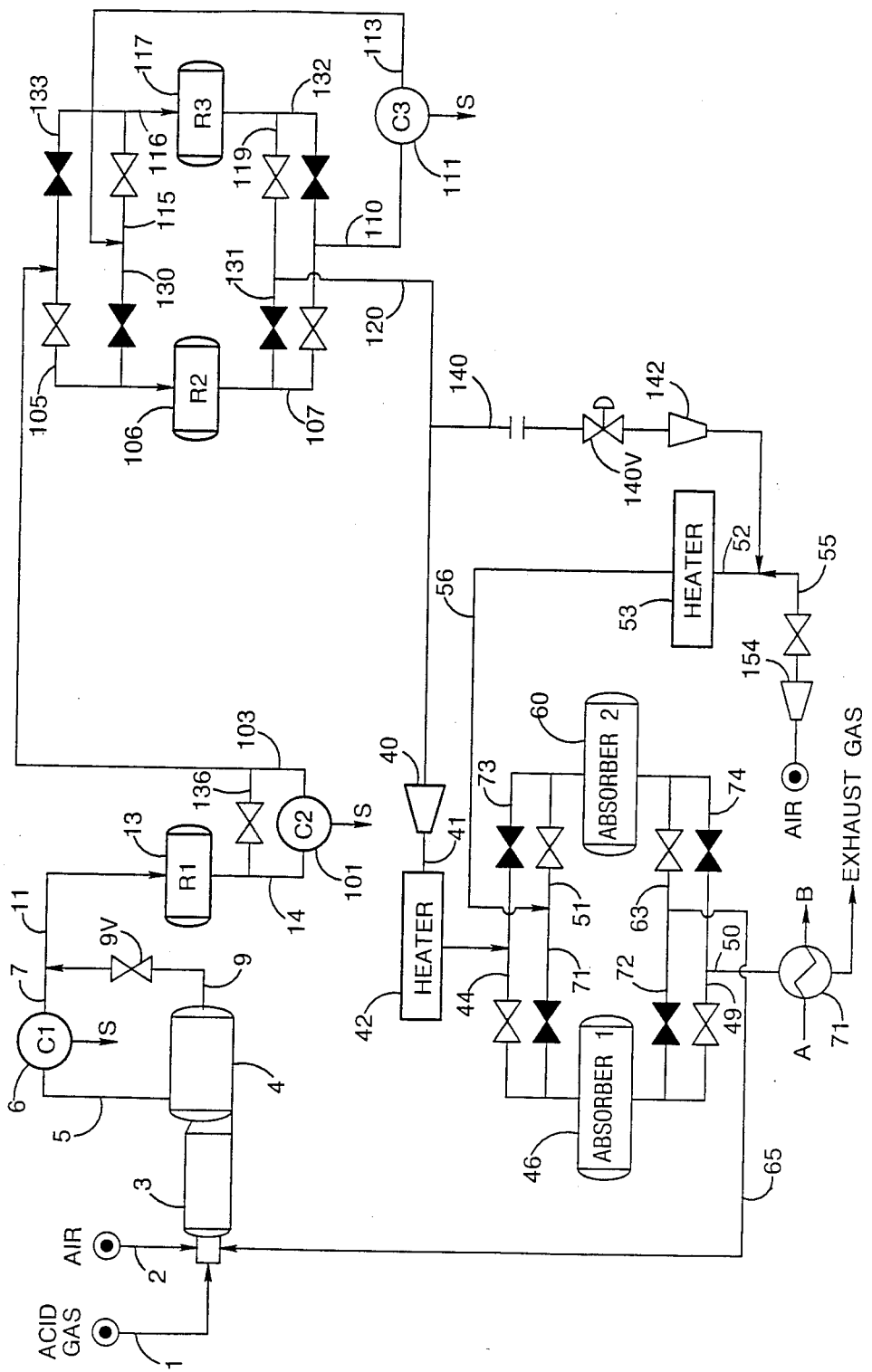

SULFUR RECOVERY PROCESS USING METAL OXIDE ABSORBER FEED FOR REGENERATION

FIELD OF THE INVENTION

The invention relates to the removal of sulfur and sulfur compounds from gaseous streams containing such compounds. In one aspect, the invention relates to the removal of sulfur compounds including $H_2S$ (hydrogen sulfide) and $SO_2$ (sulfur dioxide) from Claus plant tail gas. In another aspect, the invention relates to the use of solid high surface area contact materials (absorbents), for example, ZnO-based (zinc oxide-based) absorbents, for absorbing sulfur compounds such as $SO_2$ and $H_2S$. In a further aspect, the invention relates to regenerating sulfided ZnO-based absorbents (zinc sulfide, ZnS) under conditions for reducing the rate of regeneration effluent, and increasing the concentration of sulfur and sulfur compounds, returned to the Claus plant. In another aspect, the invention relates to absorbing sulfur compounds from a Claus plant tail gas stream using a metal oxide absorbent and regenerating the resulting sulfided absorbent in a way that reduces the size of absorber required.

SETTING OF THE INVENTION

A developing area of sulfur recovery technology is that of tail gas cleanup, that is, of removing trace quantities of sulfur compounds from gaseous effluent streams (tail gas) of Claus process sulfur recovery plants. Tail gas may contain substantial amounts of sulfur compounds. Tail gas from Claus or extended Claus plants (having at least one Claus catalytic reaction zon operated under conditions, including temperature, effective for depositing a preponderance of formed sulfur on catalyst therein) typically can contain about 0.5-10% of the sulfur present in feed to the plant as elemental sulfur, $H_2S$, $SO_2$, COS (carbonyl sulfide), $CS_2$ (carbon disulfide), and the like. Tail gas cleanup processes remove at least part of such residual sulfur compounds from Claus tail gas.

In U.S. Pat. No. 4,533,529, Claus tail gas is contacted with ZnO (zinc oxide) in an absorber reducing average overall emission levels from the absorber to less than 250 ppm sulfur species. When ZnS is being regenerated to its active ZnO form, producing $SO_2$, the resulting regeneration effluent stream comprising $SO_2$ can be returned to the Claus plant for removal of $SO_2$ by conversion to elemental sulfur.

Reducing the rate of return of such a regeneration effluent stream to the Claus plant can result in highly significant cost savings in plant construction and retrofits as well as in operation and maintenance. This is because providing the regeneration effluent stream to the Claus Plant in addition to the Claus Plant acid gas feed increases the total feed rate of gaseous streams to the Claus Plant. The result is an increase in size of the Claus Plant downstream of the site at which the regeneration effluent stream is returned. Hence, reducing the rate of return of such a regeneration effluent stream to the Claus plant can reduce the size of Claus plant required.

There is provided a process which can reduce the rate of regeneration effluent, and increase the concentration of sulfur compounds, returned to a Claus plant and can achieve the significant economic and technical benefits resulting therefrom.

According to an alternative aspect of the invention, there is provided a process which can reduce the size of absorber required for reducing sulfur compound content of Claus plant effluent to be discharged to the atmosphere to an environmentally desirable level.

In according with further aspects of the invention, there is provided a process in which the advantages of reducing the rate of regeneration effluent return to the Claus plant and of reducing the size of absorbers required for absorption can both be achieved, thus providing a greater flexibility in design and operation of such plants.

SUMMARY OF THE INVENTION

The present invention comprises an improved process and system for the recovery of sulfur and sulfur compounds from a gaseous stream. The sulfur compounds are removed from the gaseous stream in the presence of metal oxide absorbent (ZnO-based absorbent) in an absorber to produce a laden (sulfided) absorbent (ZnS) and a gaseous stream reduced in sulfur compound content. The laden absorbent ZnS is then regenerated in a regenerator by withdrawing a portion of the gaseous stream upstream of the absorber and blending the withdrawn portion with an oxygen-containing stream which is passed in contact with the absorbent, producing a regenerated absorbent (ZnO) and a regenerator effluent stream. The regenerator effluent is returned to the Claus plant. Use of absorber feed as a source of diluent for oxygen during regeneration reduces the absorption rate in the absorber, allowing regeneration to be conducted at a lower rate, reducing the recycle rate of regenerator effluent to the Claus plant, and increases the concentration of sulfur and sulfur compounds and the regenerator effluent returned to the Claus plant. Alternatively, the reduction in absorption rate can be advantageously translated into a reduction in the size of absorber required. These results can be achieved in accordance with the invention by not passing the portion of Claus plant gas-in-process used for regeneration diluent through the absorbers.

In one aspect, the invented process comprises removing sulfur compounds from a Claus plant tail gas comprising $H_2S$, $SO_2$, organic sulfides such as carbonyl sulfide (COS), carbon disulfide ($CS_2$) and the like, and elemental sulfur. The tail gas is provided to an absorber containing a metal oxide absorbent (ZnO-based absorbent) effective for removal of at least $H_2S$ from the stream. $H_2S$ in the stream is absorbed by the metal oxide absorbent (ZnO) producing sulfided absorbent (ZnS) and absorber effluent. The sulfided absorbent ZnS is then regenerated in a regenerator by withdrawing a portion of absorber feed upstream from the absorber and blending the withdrawn portion with an oxygen-containing stream, and then passing the resulting dilute oxygen-containing stream in contact with the sulfided absorbent ZnS producing a regenerated absorbent ZnO and regeneration effluent. The regenerator effluent is provided back to the Claus plant where sulfur compounds therein are converted to elemental sulfur and removed.

In a further aspect, the process comprises removing sulfur compounds from a Claus plant tail gas stream having at least one Claus low temperature catalytic absorption zone operated under conditions, including temperature, such that a preponderance of elemental sulfur formed is deposited on the Claus conversion catalyst.

By withdrawing a portion of absorber feed upstream of the absorber containing metal oxide absorbent, and using that portion as a diluent for oxygen during regeneration, the rate of regenerator effluent recycled back to the Claus plant can be significantly reduced in comparison to a process which utilizes absorber effluent as a diluent stream. See, for example, U.S. Pat. No. 4,533,529 (1985). Withdrawing a portion of the absorber feed upstream from the absorbent reduces the rate of sulfur compound containing gaseous feed introduced into contact with the absorbent in the absorber. As there is a smaller quantity of sulfur compounds to be absorbed by the absorbent per unit time, the absorber loading rate is decreased. Then, the rate at which the absorbent is regenerated in the regenerator can correspondingly be decreased, thereby decreasing the rate at which regeneration effluent is recycled to the Claus plant for further sulfur recovery. Reducing the rate at which recycle is provided to the Claus plant results in a reduction in the total gaseous feed rate to the Claus plant. Hence, the rate at which gaseous effluent is produced from the Claus plant is reduced, and therefore the rate at which such effluent is processed in the absorber is likewise reduced. The end result is a significant reduction in the sizing of equipment required for a Claus plant with metal oxide absorbers for tail gas cleanup with a corresponding reduction in capital and operating costs.

Alternatively, the benefits of not passing the portion of Claus plant tail gas required for regeneration diluent through the absorber can be utilized in achieving a reduction in the size of absorber required. Further, combinations of these advantages will be apparent to those skilled in the art from the present disclosure.

The invention accordingly comprises the processes and systems, together with their steps, parts, and interrelationships which are exemplified in the present disclosure, and the scope of which will be indicated in the appended claims.

BRIEF DESCRIPTION OF THE DRAWINGS

The FIGURE shows schematically an embodiment of the invention.

DETAILED DESCRIPTION OF THE INVENTION

The invention comprises introducing a sulfur and sulfur compound containing gaseous stream into an absorber zone containing ZnO effective for removing at least $H_2S$ from the gaseous stream under conditions, including temperature and composition, for such removal, producing sulfided absorbent ZnS and absorber effluent reduced in sulfur compound content. ZnS is regenerated in a regenerator by withdrawing a portion of absorber feedstream upstream of the absorber and blending the withdrawn portion with an oxygen-containing stream and then passing the resulting oxygen-containing stream in contact with ZnS regenerating the absorbent to ZnO and producing regenerator effluent. Regenerator effluent is recycled back to the Claus plant for further sulfur recovery.

The portion of absorber feed withdrawn upstream of the absorber for use as a regeneration diluent can be any suitable gas-in-process in the the Claus plant or can be the Claus plant tail gas. Thus, the diluent stream can be withdrawn downstream of a sulfur condenser following a first or subsequent Claus catalytic reactor, or preferably can be the Claus plant tail gas feed itself to the absorbers.

In the Claus plant, sulfur is recovered from an $H_2S$-containing stream by introducing the stream into a thermal reaction zone (Claus furnace) and at least one Claus catalytic reaction zone. The Claus thermal reaction zone can be, for example, a Claus muffle furnace, a fire tube (tunnel) furnace, or the like. Generally, the Claus thermal reaction zone functions for converting a portion of $H_2S$, preferably about ⅓, to $SO_2$ for thermal or catalytic Claus reaction with $H_2S$ to form elemental sulfur.

In the Claus furnace, the $H_2S$-containing gas and oxidant can be reacted at a temperature generally in the range of about 1800°-2600° F. The effluent from the Claus thermal reaction zone can be cooled, for example, in a waste heat boiler, and optionally passed through a sulfur condenser to condense and remove liquid sulfur.

The gaseous effluent can then be fed into a Claus catalytic reaction zone operated above the sulfur dewpoint having an inlet temperature in the range, for example, of about 350°-650° F. In the Claus catalytic high temperature catalytic reactor, sulfur is formed by the Claus reaction (shown below) in the presence of an effective Claus reaction-promoting catalyst such as alumina or bauxite:

$$2\ H_2S + SO_2 \rightarrow 3\ S + 2\ H_2O$$

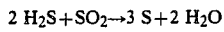

Elemental sulfur vapor can be continuously removed from the reactor and provided to a sulfur condenser where it is condensed and removed as a liquid. Gaseous effluent from the sulfur condenser can be reheated, if desired, and passed to further high temperature Claus reactors and associated sulfur condensers as is known in the art. The effluent gas from the final sulfur condenser is then the Claus plant tail gas.

Preferably, the Claus plant tail gas is from a Claus plant which includes at least one Claus catalytic reactor operated under conditions, including temperature, effective for depositing a preponderance of the formed sulfur on Claus catalyst therein. Such a Claus low temperature adsorption zone can be broadly operated in the range of from about 160° to about 330° F., preferably in the range of from about 260°-320° F.

The operation of such Claus plants having Claus high temperature reactors and Claus low temperature adsorption reactors is well known in the art and need not be further described here.

The tail gas from such Claus plants comprises $H_2S$, $SO_2$, organic sulfides, and reducing species such as $H_2$ and CO. Tail gas from plants having only Claus high temperature reactors can contain $H_2S$ in the range of about 0.4 to about 4 mol %, $SO_2$ in the range of about 0.2 to about 2 mol %, water in the range of about 20 to about 50 mol % (typically 30–40 mol %), as well as organic sulfides such as COS and $CS_2$, and elemental sulfur. Where the tail gas is from a plant having one or more Claus low temperature adsorption reactors, the tail gas may have equivalent of about 0.4 mol %, preferably about 0.2 mol %, or less single sulfur species.

Use of at least one Claus low-temperature adsorption reactor is preferable in part because such reactors remove significant amounts of organic sulfides, such as COS, $CS_2$, and the like from the gas in process. These organic sulfides are not removed by sulfur recovery processes such as the IFP process described in DeZael, et al., U.S. Pat. 4,044,114 (1977) which forms elemental sulfur in the presence of polyethylene glycol and sodium benzoate.

For the same reason, it is also preferred to operate at least one Claus high temperature reactor so that effluent has a temperature in the range from about 550° to 700° F., preferably from about 600° to 650° F. to diminish the amount of organic sulfides in the effluent.

Both $H_2S$ and $SO_2$, as well as organic sulfides, can be concurrently removed in the absorber in the presence of reducing species for reducing the $SO_2$ and other sulfur species to $H_2S$. Alternatively, sulfur species other than $H_2S$ can be converted to $H_2S$ in a hydrogenation zone prior to introduction into the absorber. In either case, it is preferred to operate the Claus plant so that about a 2:1 ratio of $H_2S$:$SO_2$ is maintained in the Claus plant tail gas to maximize sulfur recovery in the Claus plant and to minimize the amount of sulfur remaining in the Claus plant tail gas to be removed by the ZnO absorbers. By reducing the organic sulfide and other sulfur content in the feed to the absorbers, the volume of regeneration effluent returned to the Claus plant can be diminished. An effect of operating at about a 2:1 ratio is that significant quantities of both $H_2S$ and $SO_2$ are present in the Claus plant tail gas.

The reducing species, for example, $H_2$, and/or CO required for conversion of sulfur compounds in the tail gas to $H_2S$ can be obtained from any convenient source including that present in the tail gas as $H_2$, or available from a donor such as CO, which can react with water to yield $H_2$. $H_2$ is preferred, whether contained in the tail gas or internally generated or provided from an outside source.

The Claus plant tail gas can contain sufficient reducing species where the Claus plant is appropriately operated. For most Claus plants, by operating the Claus furnace so that slightly less air is utilized than that required for reaction (1)

$$H_2S + O_2 \rightarrow H_2O + \tfrac{1}{2}S + \tfrac{1}{2}SO_2 \tag{1}$$

and by insuring that the tail gas leaving the final sulfur condenser of the Claus plant has a low level of residual elemental sulfur, the Claus plant tail gas will contain sufficient reducing species. By further reducing the amount of oxidant introduced into the Claus furnace or by other methods which will be apparent to persons skilled in the art, the amount of reducing species can be further increased if desired.

The Claus plant tail gas having sufficient reducing species to reduce all sulfur compounds therein to $H_2S$ can be heated, for example, directly by means of direct fired heaters, or indirectly by heat exchange, for example, with other process streams such as absorber effluent, to produce a heated Claus plant tail gas effluent stream having a temperature effective for removal of both $H_2S$ and $SO_2$ in the presence of a solid particulate preferably high surface area (for example, pellets, extrudates, and the like) ZnO absorbent effective for such removal. This simultaneous removal of both $H_2S$ and $SO_2$ is considered to proceed by hydrogenation of sulfur compounds present in the tail gas to $H_2S$ in the presence of ZnO, ZnO in this respect acting as a catalyst, followed by absorption of the thus-formed $H_2S$ by the ZnO by sulfiding the ZnO to ZnS, the ZnO acting as an absorbent. Preferably, the Claus plant tail gas can be heated to above about 1000° F. By operating at these absorber temperatures, a hydrogenation reactor is not required before removal of $H_2S$ and other sulfur compounds in the absorber. Conversely, temperatures below about 1000° F. can be used during absorption with the addition of a separate and distinct hydrogenation reactor or zone prior to the absorbers. When operating at temperatures above about 1000° F., $H_2S$ emissions can set a practical upper limit on the absorption temperature which will be used. Currently for these reasons it may be appropriate that the upper limit during absorption be about 1200° F. Higher temperatures can also be used. Absorber operation above about 1000° F. is preferred because such higher temperatures favor higher absorption capacity and the hydrogenation reactor can be eliminated. Also, since absorption and regeneration will then be conducted at approximately the same inlet temperature (1000°-1200° F.), temperature stress on equipment can be reduced. As a result, there will be no significant heating and cooling period. Hence, the time available for regeneration and absorption will be increased and the volume of regeneration effluent returned to the Claus plant can be decreased.

Where the Claus plant tail gas is introduced into a hydrogenation zone prior to the ZnO absorbers, the principal reaction will be the conversion of $SO_2$ to $H_2S$ as shown by Reaction (6) below; other sulfur compounds including elemental sulfur, COS, $CS_2$, and the like will also be reduced to $H_2S$. Hydrogenation can be carried out at a temperature of from about 450° to about 1200° F. or even higher, preferably from about 580° F. to about 800° F., depending on the conditions and the source of $H_2$ chosen. Hydrogenation by contacting with a bed, either supported or fluidized, of effective hydrogenation catalyst is preferred. Useful catalysts are those containing metals of Groups VB, VIB, VIII and the Rare Earth series of the "Periodic Table of the Elements" in Perry and Chilton, *Chemical Engineers Handbook*, 5th Ed. The hydrogenation catalyst may be supported or unsupported. Catalysts supported on a refractory inorganic oxide, such as on a silica, alumina or silica-alumina base are preferred. The preferred catalysts are those containing one or more of the metals, cobalt, molybdenum, iron, chromium, vanadium, thorium, nickel, tungsten (W) and uranium (U) added as an oxide or sulfide of the metal, although the sulfide form appears to be the active form. Particularly preferred are cobalt-molybdenum hydrogenation catalysts such as are commercially available for use in the refining industry for desulfurization processes in the refining of oil.

After hydrogenation, the resulting stream now containing substantially all sulfur compounds in the form of $H_2S$ can then be contacted in an absorber zone with a suitable ZnO absorbent (either fixed or fluidized bed) to absorb $H_2S$ and to produce a laden (sulfided) absorbent at temperatures in the range of about 600° F. to about 1000° F. Alternatively, where absorption is conducted at a temperature above about 1000° F., for example, in the range of about 1000° F. to about 1200° F., the absorption of $H_2S$ can be accomplished in an absorber simultaneously with removal of the other sulfur compounds without prior hydrogenation. In either event, while a first absorption zone is functioning as an absorber, a second absorption zone can be functioning as a regenerator.

As used herein, and in the claims, the terms "metal oxide absorbent", "ZnO", "ZnO absorbent", and the like shall mean an absorbent effective for removal of both $H_2S$ and $SO_2$ in the presence of reducing species. A major portion of the active absorbent, for example, fifty percent or more, is in the form of ZnO which is the active form. The absorbent can also contain binders, strengtheners, and support materials, for example, alumina ($Al_2O_3$), calcium oxide (CaO) and the like. Zinc sulfide and zinc sulfate can be used as starting materials and treated with heat and/or oxygen to produce an active ZnO absorbent. Other suitable starting materials can also be used. The ZnO absorbent is effective for absorbing $H_2S$ by undergoing sulfidization to produce a laden (sulfided) absorbent; simultaneously, if desired, hydrogenation of other sulfur compounds to $H_2S$ followed by such absorption can occur. Preferably, the ZnO absorbent is capable of a high level of removal of sulfur compounds and is relatively insensitive to water.

Particularly preferred are ZnO absorbents which are thermally stable, regenerable, and capable of absorbing substantial amounts of sulfur compounds. An acceptable absorbent is United Catalysts, Inc., G72D Sulfur Removal Catalyst, available from United Catalysts, Inc., Louisville, Ky., having the following chemical composition and physical properties:

| CHEMICAL COMPOSITION | | | |
|---|---|---|---|
| | wt % | Trace Metal Impurities | wt % |
| ZnO | 90.0 ± 5% | Pb | <0.15 |
| Carbon | <0.20 | Sn | <0.005 |
| Sulfur | <0.15 | As | <0.005 |
| Chlorides | <0.02 | Hg | <0.005 |
| $Al_2O_3$ | 3-7 | Fe | <0.1 |
| CaO | 0.5-3.0 | Cd | <0.005 |

| PHYSICAL PROPERTIES | |
|---|---|
| Form | Pellets |
| Size | 3/16 in. |
| Bulk Density | 65 ± 5 lbs/ft3 |
| Surface Area | 35 m2/g minimum |
| Pore Volume | 0.25-0.35 cc/g |
| Crush Strength | 15 lbs minimum average |

Representative chemical reactions considered to occur during absorption, regeneration and purging are shown below:

During absorption:

$$H_2S + ZnO \rightarrow ZnS + H_2O \quad (3)$$

$$COS + ZnO \rightarrow ZnS + CO_2 \quad (4)$$

$$CS_2 + 2ZnO \rightarrow 2ZnS + CO_2 \quad (5)$$

$$SO_2 + 3H_2 \rightarrow H_2S + 2H_2O \quad (6)$$

$$H_2S + \text{Sulfated Absorbent} \rightarrow SO_2 + \text{ZnO Absorbent} \quad (7)$$

During absorption, $H_2S$, COS and $CS_2$ in the stream can react with ZnO to form ZnS as shown in Eqs. (3) to (5). $SO_2$ can react directly with $H_2$ to form $H_2S$ as shown by Eq. (6), and the resulting $H_2S$ can then react with ZnO. COS and $CS_2$ may also be hydrogenated to $H_2S$ before absorption by ZnO. When elements in the absorbent such as zinc, calcium, aluminum, or other elements become sulfated during regeneration, $SO_2$ may be produced during absorption as indicated by Eq. (7) due to the presence of effective reducing species in the absorber feed. Sulfation is reversed by purging the regenerated absorbent with effective reducing species before returning regenerated ZnO to absorption and returning the produced $SO_2$ to the Claus plant for sulfur formation and removal.

During Regeneration:

$$ZnS + 3/2O_2 \rightarrow ZnO + SO_2 \quad (8)$$

$$\text{Absorbent} + SO_2 + O_2 \rightarrow \text{Sulfated Absorbent} \quad (9)$$

Regeneration of sulfided absorbent is effected by oxidizing ZnS to ZnO as shown by Eq. (8). Absorbent sulfation can also occur, as shown by Eq. (9) during regeneration in the presence of $O_2$ and $SO_2$. Temperature rise during regeneration can suffice if unchecked to destroy both the physical integrity and the chemical activity of the absorbent as well as to exceed metallurgical limits of preferred materials of construction. Consequently, temperature rise during regeneration is preferably controlled to less than about 1500° F.

During Purging:

$$\text{Sulfated Absorbent} + H_2 \rightarrow \text{Absorbent} + SO_2 + H_2O \quad (10)$$

$$\text{Sulfated Absorbent} + CO \rightarrow \text{Absorbent} + SO_2 + CO_2 \quad (11)$$

$$\text{Sulfated Absorbent} + H_2S \rightarrow \text{Absorbent} + SO_2 + H_2O \quad (12)$$

Reduction of the sulfated absorbent will occur at a temperatures above about 1000° F. in the presence of $H_2$, CO or other reducing species such as $H_2S$. Reduction of the sulfated absorbent does not occur at lower temperatures such as 900° F. or lower or in the absence of such effective reducing species.

Methane, although a reducing gas, may not be effective in reasonable periods of time under process conditions for purging. Further, purging with an inert gas will not prevent the $SO_2$ emissions increase upon returning to absorption. Rather, upon switching to absorption, the sulfated ZnO absorbent will be contacted with a stream containing the effective reducing species ($H_2$, CO, and $H_2S$) and $SO_2$ emissions will occur. Accordingly, for the purging, it is essential that effective reducing species be present and that the temperature be greater than about 1000° F.

The absorber zone containing ZnO can comprise at least a first absorption zone (functioning as an absorber) and a second absorption zone (functioning as a regenerator) and the process can comprise contacting $H_2S$ with absorbent in the absorber to remove it and other sulfur species producing a laden absorbent and absorber effluent lean in sulfur species. Absorption can be continued for a period of time (absorption), preferably less than that required for $H_2S$ breakthrough from the absorber. For practical purposes, $H_2S$ breakthrough can be defined as occurring when the $H_2S$ concentration in the absorber effluent stream reaches a preset low value, such as for example, 50 ppm $H_2S$. Concurrently, with absorption in the absorber, laden absorbent in the regenerator can be regenerated by introducing a regeneration stream comprising dilute $O_2$ thereinto at a temperature effective for converting laden sulfided absorbent to active absorbent. In accordance with the invention, a portion of absorber feed upstream of the absorber is utilized for diluting the $O_2$ to produce the dilute $O_2$ containing regeneration stream. Regeneration effluent comprising $SO_2$ is returned from the regenerator to the Claus plant, for example, to the thermal reaction zone or to a downstream Claus catalytic reaction zone. Thereafter, the absorber and the regenerator can be interchanged, with the second absorption zone now functioning as absorber and the first absorption zone now functioning as a regenerator, and the process can be repeated and continued. Prior to interchanging the absorber and the regenerator, freshly regenerated absorbent in the regenerator is purged with an effective reducing gas. For example, purging can be conducted by discontinuing the introduction of $O_2$ into the portion of absorber feed utilized for diluent during regeneration, and continuing flowing of the thus withdrawn portion of absorber feed for a period of time effective for reducing to a desired level an otherwise observed temporary increase in $SO_2$ occurring where a freshly regenerated ZnO-based absorbent is returned to absorption without such purge.

During regeneration of ZnS to ZnO, a temperature rise of about 145° F. occurs for each mol percent of oxygen consumed in converting ZnS back to ZnO. To avoid exceeding about about 1500° F. and to maintain absorbent physical and chemical integrity during regeneration, a maximum of about 3.5 mol % oxygen can be used during regeneration when the regeneration stream is introduced at about 1000° F., and a maximum of about 2.75 mol % $O_2$ when the regeneration stream is introduced at about 1100° F. Thus, preferably oxygen is introduced during regeneration at a concentration of about 0.4 or less to about 3.5 mol %, more preferably at about 1 to about 2.75 mol %. Due to the exothermic nature of the regeneration reaction, suitable methods for diluting the oxygen can be used. Higher temperatures of regeneration up to about 2100° F. can also be used and the amount of $O_2$ introduced increased accordingly.

The flow rate during regeneration is preferably a rate sufficient to complete regeneration and purging as described herein of a ZnO absorber while absorption is conducted in another ZnO absorber. In this way, only two absorption zones will be required. Some time can also be allowed for the contingency of process upsets (slack time). Preferably, the flow rate during regeneration is such that the period during which regeneration is occurring is substantially equal to the period during which absorption is occurring less the period required for purging as herein set forth and such slack time.

As indicated, regeneration effluent comprising $SO_2$ is returned from the regenerator to the Claus plant for conversion of the $SO_2$ to elemental sulfur which is removed from the gas in process. Dilution of the $O_2$ using absorber feed reduces the rate of regeneration effluent being returned to the Claus plant and increases the concentration of sulfur and sulfur compounds returned to the Claus plant. This has the desired result of decreasing the size of the Claus plant and equipment downstream of the locus where the regeneration effluent is reintroduced resulting in significant cost decreases as compared with other sources of gas diluent. Further, the increased concentration of sulfur and sulfur compounds in the regenerator effluent return to the Claus plant facilitates maintenance of stable flame temperatures and conditions in the Claus furnace. Alternatively, the size of absorbers required for treatment of the Claus plant tail gas can be reduced.

Absorber feed can be used for diluent and the rate of regeneration effluent returned to the Claus plant can be still further reduced where the Claus plant comprises at least one Claus low-temperature absorption reactor.

By use of such a low-temperature Claus adsorption reactor, the absorption rate for a ZnO absorber is decreased in comparison with the rate where such a Claus low-temperature adsorption zone is not used, allowing $O_2$ to be introduced to the regenerator at a still lower rate, further reducing the rate at which regeneration occurs, and further reducing the rate at which regeneration effluent is returned to the Claus plant.

Regeneration can be continued until substantially all of the sulfided absorbent is regenerated, for example, until ZnS is substantially reconverted to ZnO. Completion of regeneration can be conveniently determined by monitoring $O_2$ or $SO_2$ content or temperature of the regenerator effluent stream. Preferably, an $O_2$ analyzer is employed downstream of the regenerator to determine the presence of $O_2$ in the regenerator effluent, which is an indication of completion of regeneration.

As will be appreciated by those skilled in the art from the foregoing discussion, materials of construction for the valves, vessels, and piping for the process according to the invention can require special attention. The material preferably has the capability of withstanding high temperatures, for example, in the range of about 800° F. to about 1500° F. or higher while being repeatedly exposed to reducing and oxidizing atmospheres in the presence of sulfur compounds.

Following regeneration, prior to returning the regenerated absorbent for use during the absorption cycle, the regenerated absorbent is treated (purged) by passing a reducing stream in contact with the regenerated, albeit sulfated absorbent, for a period of time effective for reducing a temporary increase in $SO_2$ emissions otherwise occurring when freshly regenerated ZnO absorbent is returned to absorption without such purging with a reducing gas. Preferably, the time is effective for reducing $SO_2$ emissions to below about 250 ppm at all times. Most preferably, the time is effective for substantially eliminating the increase in $SO_2$ emissions, that is, for reducing the increase in $SO_2$ emissions by 90% or more from the level occurring where such a reducing gas purge is not used prior to returning to absorption.

The effective purge time can be readily determined by one skilled in the art by monitoring $SO_2$ emissions from an absorber following returning a freshly regenerated reactor to absorption function and increasing the purge time prior to returning to absorption until the $SO_2$ emissions are reduced to a desired level upon returning to absorption.

The purge stream can comprise a portion of absorber effluent or any other suitable reducing gas stream. In accordance with the invention, the purge is preferably effected by using the same portion of absorber feed used for diluent during regeneration, by discontinuing the flow of $O_2$ to the regenerator during the purge period.

The invention will be further understood and appreciated from the following EXAMPLE.

EXAMPLE

Sizing of absorbers is calculated using data from a demonstration plant. The effects of using absorber feed or absorber effluent for regeneration diluent is evaluated for two cases. In Case I, the feed to the ZnO absorber is effluent from a Claus plant having three catalytic reactors operated above the sulfur dewpoint. In Case II, the feed to the ZnO absorber is effluent from a Claus plant having two catalytic reactors operated above the sulfur dewpoint and having at least one catalytic reactor operated under conditions, including temperature, effective for depositing a preponderance of sulfur form on the catalyst therein. The results of using absorber feed or absorber effluent on the relative size of absorbers for the two cases are shown in the following Table.

TABLE

|  | Regeneration Diluent | Relative Size of Absorbers |
| --- | --- | --- |
| Case I | Absorber Feed | 1.0 |
| Case I | Absorber Effluent | 1.7 |
| Case II | Absorber Feed | 1.0 |
| Case II | Absorber Effluent | 1.3 |

The results indicate that the use of absorber feed for regeneration diluent reduces the size of absorber required. Comparison of Case I and Case II indicates that the use of absorber feed has a greater relative effect in reducing the size of absorbers required when the sulfur content of the absorber feed is greater, as in Case I than when the sulfur content of the absorber feed is greater (Case I) than when content is lesser (Case II).

Referring now to the FIGURE, an exemplary embodiment of the invented process is represented in which the gaseous effluent stream from a 3-reactor Claus plant having two reactors (R2, R3) periodically operated under conditions, including temperature, effective for depositing a preponderance of formed elemental sulfur on catalyst therein, is provided to an absorber containing metal oxide absorbent in which $H_2S$, and preferably also $SO_2$, are absorbed therefrom at temperatures above about 1000° F.

An acid gas stream containing $H_2S$ and an $O_2$ containing stream are fed into a furnace 3 by lines 1 and 2, respectively, and combusted to produce effluent gas, comprising elemental sulfur, uncombusted $H_2S$, $SO_2$, and water. Effluent from the furnace 3 is cooled in a waste heat boiler 4. A resulting gas stream, for example, at a temperature of about 550° F., is passed by line 5 to first sulfur condenser 6 which condenses vaporized elemental sulfur from the stream. The gas stream leaves the first sulfur condenser 6 by line 7 at a temperature, for example, of about 400° F. Hot gas from the waste heat boiler 4 is also introduced by line 9 having valve 9V into line 7 leaving the first condenser 6 at a rate so that the gas stream in line 11 is, for example, about 450° F.-600° F. The gas stream 11 is passed to a first catalytic reactor 13 where further conversion of $H_2S$ and $SO_2$ into elemental sulfur occurs above the sulfur dewpoint in the presence of an effective Claus reaction promoting catalyst, and the resulting elemental sulfur is continuously removed in the vapor phase.

The gaseous effluent stream from the first catalytic reactor 13 is provided to a second sulfur condenser 101 by line 14 and condensed elemental sulfur is removed as shown. The gas stream leaving the second condenser by line 103 flows to a second catalytic reactor 106 on adsorption by line 105, having an associated valve as shown. During adsorption, the second catalytic reactor 106 inlet temperature is preferably maintained at a temperature in the range of about 250° F. to about 280° F. The gaseous effluent stream from the second catalytic reactor 106 leaves by line 107, having an associated valve as shown and is provided by line 110 to a condenser/cooler 111 functioning during adsorption as a cooler. The gas stream then leaves the condenser/cooler 111 by line 113 and is provided to a third catalytic reactor 117 by line 113, line 115, having an associated valve as shown, and line 116. The third catalytic reactor 117 is also operated under conditions, including temperature, such that a preponderance of formed elemental sulfur is deposited on the catalyst therein.

Periodically, catalyst having sulfur deposited thereon in the catalytic reactor 106 can be regenerated by passing a portion of the hot gaseous effluent stream from the first catalytic reactor 13 by line 136, having an associated valve therein, and line 103 to second catalytic reactor 106. During regeneration, elemental sulfur is vaporized from the catalyst, and the vaporized elemental sulfur can be condensed from the stream in the third condenser/cooler 111, and elemental sulfur can be removed as shown.

In the illustrated embodiment, the gaseous stream in line 103 is provided to reactor R2. By closing the valves in lines 105, 107, 115, and 119 and by opening the valves in lines 130, 131, 132, and 133, reactors R2 and R3 can be interchanged so that the gas stream in line 103 first flows to reactor R3. This will be done when the reactor R3, originally in the downstream position, which takes the longest to become laden with sulfur, is in need of regeneration. Thereafter, regeneration and adsorption can occur in R3 with reactor R2 in the downstream position until reactor R2 is again laden and switching will again occur. The operation of such plants is known to those skilled in the art and need not be further described here.

The gaseous effluent stream in line 120 from the Claus plant (Claus plant tail gas) in accordance with the invention is divided into two portions. One portion, is passed through line 140 around the ZnO absorbers. The second portion is passed to a ZnO absorber, for example, absorber 46 by line 120, blower 40, line 41, and heater 42. Heater 42 functions for heating the stream to a temperature above about 1000° F., and the resulting heated stream is introduced by line 44 having an associated valve into the first absorber 46 (shown on absorption). Second absorber 60 is shown on regeneration. (Following regeneration and purging as herein described, the first and second absorbers can be interchanged by closing the valves in lines 44, 49, 51, and 63 (shown open), and by opening valves in lines 71, 72, 73, and 74 (shown closed). In this mode, second absorber 60 will be on absorption and first absorber 46 will be on regeneration and purging.)

The first absorber zone 46 containing ZnO removes sulfur compounds from the portion of Claus plant tail gas introduced and produces absorber effluent containing less than about 50 ppm $H_2S$. The absorber effluent can be conducted by lines 49 and 50 and by heat recuperator 71 for discharge.

In accordance with the invention, the portion of Claus plant tail gas stream withdrawn by line 140 in valve 140V is employed via blower 142 for dilution of atmospheric air or other oxygen-containing gas provided via compressor 154 and line 55 having an associated valve therein, to produce a dilute oxygen containing regeneration stream in line 52.

The regeneration stream in line 52 is heated in heater 53 to regeneration temperatures and can be conducted by lines 56 and 51, having an associated valve therein, to second absorber 60 (shown on regeneration). The heated regeneration stream is thus passed in contact with sulfided absorbent in second absorber 60 to produce regeneration effluent containing $SO_2$. The regeneration effluent is conducted by line 63 having an associated valve therein and by line 65 back to the Claus plant, for example to the furnace 3. The regeneration effluent can also be provided to a downstream catalytic reaction zone. Following regeneration, purging can be effected in accordance with the invention by discontinuing oxygen to the second absorber 60, for example, by closing the valve in line 54, and continuing to pass the portion of Claus plant tail gas through the absorber on regeneration for a period of time sufficient to reduce or eliminate an otherwise observed increase in $SO_2$ emissions which occurs when freshly regenerated absorbent is contacted with a reducing gas stream, such as, for example, absorber feed. During this purge period, the effluent from the freshly regenerated absorber can continue to be provided to the Claus plant as during regeneration.

Absorption is continued in the first absorber 46 and regeneration is continued in the second absorber 60 until prior to or just before $H_2S$ breakthrough occurs in effluent from first absorber 46. Preferably, the oxygen content and regeneration stream flow rate is established so that the regeneration time is about equal to absorption time prior to $H_2S$ breakthrough. $H_2S$ breakthrough can be determined by monitoring the $H_2S$ content of the first absorber effluent stream 47 until $H_2S$ content exceeds a predetermined limit. Following $H_2S$ breakthrough, first absorber 46 can be placed on regeneration and second absorber 60 can be placed on absorption as described above.

While the invention has been described as required in accordance with a preferred embodiment and setting forth specific operating conditions and materials, the invention is not to be construed to be limited thereby but by the scope of the claims appended hereto.

What is claimed is:

1. A process for the recovery of sulfur and sulfur compounds from a gaseous stream comprising hydrogen sulfide, the process comprising:
   (a) introducing the gaseous stream into an absorber zone comprising a metal oxide absorbent effective for removal of at least hydrogen sulfide from the gaseous stream;
   (b) removing at least hydrogen sulfide from the gaseous stream in the presence of the metal oxide absorbent and producing a laden absorbent and absorber effluent reduced at least in hydrogen sulfide content; and
   (c) regenerating the laden absorbent in a regeneration zone using a regeneration gas consisting of an oxygen-containing stream blended with gas-in-process withdrawn from upstream of all of the absorber units in the absorber zone, the resulting diluted oxygen-containing stream being passed in contact with the laden absorbent and regenerating the absorbent, thereby producing regeneration effluent comprising sulfur dioxide.

2. The process of claim 1 wherein: the metal oxide absorbent is zinc oxide.

3. The process of claim 1 wherein:
   the gas-in-process is the tail gas from a Claus sulfur recovery plant.

4. The process of claim 1 wherein:
   the gas-in-process is the tail gas from a Claus sulfur recovery plant having at least two Claus catalytic reactors.

5. The process of claim 1 wherein:
   the gas-in-process is tail gas from a Claus sulfur recovery plant having at least one catalytic reaction zone operated under conditions, including temperature, such that formed elemental sulfur is deposited on the Claus catalyst therein.

6. The process of claim 2 further comprising:
   returning thus-produced regeneration effluent to a Claus sulfur recovery plant from which the gaseous stream introduced in step (a) of claim 1 is derived.

7. The process of claim 6 wherein the absorber zone comprises at least a first absorber unit and a second absorber unit, and comprising;
   (i) reacting a gaseous stream in the presence of said reducing agents and a metal oxide absorbent in the first absorber unit and producing a laden absorbent and absorber effluent lean in sulfur compound content;
   (ii) continuing absorption in the first absorber unit for a period of time less than that required for hydrogen sulfide breakthrough;
   (iii) thereafter reacting the gaseous stream in the presence of said reducing agents and the metal oxide absorbent in the second absorber unit and producing a laden absorbent and an absorber effluent stream reduced in sulfur compound content; and
   (iv) simultaneously with step (iii) regenerating the laden absorbent in the first absorber unit using a regeneration gas consisting of an oxygen-containing stream blended with gas-in-process withdrawn from upstream of all of the absorber units in the absorber zone, the resulting diluted oxygen-containing stream being passed in contact with the laden absorbent and regenerating the absorbent, thereby producing regenerated absorbent and regeneration effluent comprising sulfur dioxide.

8. The process of claim 1 comprising:
   following step (c), discontinuing the flow of $O_2$ into the freshly regenerated reactor, but continuing to pass the portion of gas-in-process withdrawn upstream of all of the absorber units in the absorber zone therethrough.

* * * * *